United States Patent Office 3,347,629
Patented Oct. 17, 1967

3,347,629
PROCESS AND COMPOSITION FOR $CO_2$ GENERATION FROM $Ag_2CO_3$ AND C
Wayne A. Proell, Seymour, Ind., assignor to Standard Oil Company, Chicago, Ill., a corporation of Indiana
No Drawing. Filed Jan. 29, 1965, Ser. No. 429,108
6 Claims. (Cl. 23—150)

ABSTRACT OF THE DISCLOSURE

Self-sustaining generation of carbon dioxide from an intimate mixture of silver carbonate and finely-divided carbon.

---

This invention relates to the generation of carbon dioxide gas without the formation of water and more particularly to a solid composition which when ignited generates the carbon dioxide gas in a self-sustaining reaction.

I have discovered a method of generating carbon dioxide gas without the formation of water from a solid composition which does not require storage under pressure. In my method, I combine a heavy metal carbonate, such as silver carbonate, and finely-divided carbon into an intimate physical mixture and ignite the mixture to initiate a self-sustaining reaction which produces the carbon dioxide gas.

Briefly, the invention is directed to the method of generating carbon dioxide gas from a solid composition which remains solid under atmospheric temperature and pressure and to the solid composition useful for producing the carbon dioxide gas.

The method and composition are useful for providing carbon dioxide gas essentially free of water for non-electrical circuits in airborne instruments and computers. In addition to other advantages, use of the method and composition avoids the requirement of pressure equipment for the storage of the composition and the added weight associated with the pressure equipment.

The method of generating carbon dioxide gas without the formation of water comprises combining silver carbonate and finely-divided carbon into an intimate physical mixture and igniting the mixture to produce the carbon dioxide gas. Advantageously, the silver carbonate and carbon are mixed and then compacted under pressure to produce a hard, dense, solid slug of material.

In the method, it is important to produce an intimate physical mixture of the silver carbonate and finely-divided carbon to provide an effective or reaction-sustaining contact between the components in the mixture. When the surface of contact is too small through the use of large particles of carbon or insufficient mixing, the reaction tends not to be self-sustaining and may proceed for a time and then stop.

However, with reagent grade silver carbonate and carbon black, the intimate physical mixture is obtained by mixing the components in a ball mill for a time in the order of 1–3 hours. The time of mixing is usually conditioned by the desired reaction rate of the composition. Another method is carried out by dispersing carbon black in water and precipitating the silver carbonate in the suspension. The total precipitate suitably dried constitutes an excellent intimate physical mixture.

After mixing, the composition is advantageously compacted under pressure in the order of 1,000–70,000 p.s.i. to produce a hard, dense, solid slug (or cylinder) of material. Use of the higher pressures tends to produce slugs having better uniformity of reaction rates and is therefore preferred.

The intimate physical mixture is conveniently ignited by a heat source such as a hot Nichrome wire, a match flame, a pyrotechnic igniter or the like, and advantageously a hot Nichrome wire. After the mixture is ignited, the reaction is self-sustaining and generates the carbon dioxide gas.

The temperature of the reaction is in the order of 700–760° C. as determined from the hot, solid material. The temperature of the gas is lower and may be reduced significantly by expanding the gas, by providing heat sinks, and/or by the use of a retardant such as zinc carbonate.

As noted above, the solid composition of the invention when ignited generates carbon dioxide gas without the formation of water and with a self-sustaining reaction. The composition comprises an intimate physical mixture of silver carbonate and finely-divided carbon. Usually a stoichiometric quantity of the components is preferred although in some instances other quantities may be desired, the stoichiometry is related to the reaction of $Ag_2CO_3$ and C in a mole ratio of 2 moles $Ag_2CO_3$ to at least ⅞ mole C. However, at least about ⅞ of the stoichiometric quantity of carbon should be present to produce the self-sustaining reaction with up to about 2–3 times the stoichiometric amount of carbon being suitable, especially when CO is useful or tolerable.

The carbon when mixed with the silver carbonate should be in a finely-divided form. The carbon may be purchased in finely-divided form or ground to the desired particle size.

Suitable carbons include channel blacks, rubber blacks, and highly-adsorptive activated carbons such as "Norit" and "Nuchar," the Norit being a highly-adsorptive activated carbon used to absorb odors, and to decolorize water, gases, etc. Nuchar is an activated carbon made from a residual organic material obtained in the manufacture of cellulose. Carbon blacks are particularly advantageous and are generally characterized by an exceedingly small particle size, that is, well below #325 U.S. Standard sieve particle size.

Although finely-divided carbon is required for the self-sustaining reaction, carbon in larger particle sizes, such as graphite, of a general purpose grade may be used in small amounts. The use of graphite provides advantageous lubricating characteristics to the composition which are important during the compacting operation under pressure.

The rates of reaction of the solid composition in general are dependent on the particle size of the carbon, the degree of mixing, and the pressures used in compacting the mixture. With stoichiometric amounts of reagent grade silver carbonate and carbon black being present, rates in the order of 2″/sec. may be expected. If lower rates are desired, a retardant such as zinc carbonate may be used in amounts up to about 20-mole percent of the silver carbonate present. With about 10-mole percent of zinc carbonate being present, rates in the order of 0.1″/sec. may be expected. The use of zinc carbonate also reduces the temperature of reaction.

The following examples illustrate some embodiments of this invention. It is to be understood that these are for illustrative purposes only and do not purport to be wholly definitive with respect to conditions or scope.

Example 1

In the preparation of a carbon dioxide generator, approximately a stoichiometric ratio of silver carbonate (about 68.5 grams) sold by the Mallinckrodt Chemical Works (analytical reagent grade) and finely-divided carbon black (about 1.5 grams) sold by Sid Richardson (Texas E grade) was added to a small jar containing a plurality of pebbles (about ⅜″ in diameter). The jar was placed on a rolling mill and the contents mixed into an intimate physical mixture. The mixing took about ½–1 hour, after which a solid slug of about ⅜″ in diameter and 1½" long was prepared by compacting a portion of the mixture at about 72,000 p.s.i.

Upon being ignited by a hot Nichrome wire, the slug produced a stream of carbon dioxide gas. The reaction was self-sustaining and occurred at a rate of about 2"/sec. which was measured with fuse wires. The temperature of the reaction was obtained by a thermocouple (Chromel-Alumel) in contact with the hot, solid material and was about 760° C.

The above results demonstrated that an intimate physical mixture of silver carbonate and carbon black produced carbon dioxide gas with the reaction being self-sustaining. In view of the reactants, no water of reaction was produced.

*Example II*

A test was carried out to demonstrate the slower rates of gas generation produced when zinc carbonate was added to the intimate mixture of silver carbonate and carbon. In this test, about 300 grams of intimate mixture was prepared and contained about 95.23 weight percent of silver carbonate, about 2.18 weight percent of zinc carbonate, about 2.08 weight percent carbon black, and about 0.51 weight percent of graphite. The zinc carbonate was a powder obtained from Rohm & Haas, and the graphite was a general purpose variety. The ingredients were added to the pebble mill of Example I, and the intimate physical mixture was prepared. Mixing on the rolling mill was continued until a slug (about ⅜" diameter by 1" long) burned at a rate of about 0.1"/sec. The slug was prepared by compacting a portion of the mixture at about 72,000 p.s.i. The time for mixing was about 3 hours. When the rate reached 0.1"/sec., a slug of about 1.2" in diameter and about 3" long was prepared in a small aluminum test motor having an inside diameter of about 1.2". The slug was ignited by means of a Nichrome wire and produced carbon dioxide gas. The reaction was self-sustaining and was about 0.05"/sec. The temperature of the gas was determined in the motor at a point approximately 1½" from the hot end of the slug and was about 150° C.

The above results demonstrated that the reaction rate of silver carbonate and carbon black was controllable. In Example I the rate was about 2"/sec. while that in Example II was about 0.05"/sec.

While the invention has been described in conjunction with specific embodiments thereof, these are by way of illustration only. Many alternatives, modifications, and variations will be apparent to those skilled in the art in view of our disclosure, and accordingly it is intended to embrace all such alternatives, modifications, and variations as fall within the spirit and broad scope of the appended claims.

I claim:
1. A solid composition which when ignited, generates carbon dioxide gas without the formation of water, said generation being self-sustaining, said composition comprising an intimate physical mixture of silver carbonate and carbon, said carbon having an average particle size below about #325 U.S. Standard sieve particle size, said generation obtained from the reaction of $Ag_2CO_3$ and C in a mole ratio of 2 moles $Ag_2CO_3$ to at least 7/8 mole C.
2. The solid composition of claim 1 wherein said carbon is carbon black.
3. The solid composition of claim 1 wherein said silver carbonate and carbon are present in an essentially stoichiometrical amount.
4. The solid composition of claim 3 wherein said carbon is carbon black.
5. A method of generating carbon dioxide gas without the formation of water, which method comprises combining silver carbonate and carbon, said carbon having an average particle size below about #325 U.S. Standard sieve particle size, into an intimate physical mixture and igniting said mixture to produce said carbon dioxide gas by the self-sustaining reaction of $Ag_2CO_3$ and C, the mole ratio of $Ag_2CO_3$ to C being 2 to at least 7/8.
6. The method of claim 5 wherein said silver carbonate and carbon are compacted into a hard, dense, intimate physical mixture.

References Cited

UNITED STATES PATENTS

| 1,502,592 | 7/1924 | Sauer | 252—425 X |
| 2,622,008 | 12/1952 | Miller et al. | 23—150 |

OTHER REFERENCES

Chem. Abstracts: vol. 58, p. 962C, O. Kadlec et al., "Kinetics of the Thermal Decomposition of Solids."

OSCAR R. VERTIZ, *Primary Examiner.*

A. GREIF, *Assistant Examiner.*